United States Patent [19]

Hicks

[11] Patent Number: 4,517,447
[45] Date of Patent: May 14, 1985

[54] FOOD PROCESSING APPARATUS

[76] Inventor: Kevin J. Hicks, 29-33 King St., Hornsby, New South Wales 2077, Australia

[21] Appl. No.: 508,478

[22] Filed: Jun. 27, 1983

[30] Foreign Application Priority Data

Aug. 17, 1982 [AU] Australia .................. PF5432

[51] Int. Cl.³ .......................... F27B 9/06; A21B 1/22; A21C 13/02
[52] U.S. Cl. ................................. 219/388; 99/443 C; 432/128
[58] Field of Search ................. 219/388; 99/352, 427, 99/443 C; 432/128, 148, 194

[56] References Cited

U.S. PATENT DOCUMENTS

| 1,335,915 | 4/1920 | Pointon ........................ 432/128 |
| 1,363,781 | 12/1920 | Haller ........................... 432/148 |
| 1,425,342 | 8/1922 | Schaller ......................... 432/128 |
| 1,625,761 | 4/1927 | Ballard .......................... 432/148 |
| 1,716,460 | 6/1929 | Pointon . | |
| 1,811,962 | 6/1931 | Pelkman ......................... 432/128 |
| 2,052,060 | 8/1936 | Sperling . | |
| 3,882,768 | 5/1975 | Troisi ............................ 99/352 |
| 4,004,129 | 1/1977 | Hicks ............................. 219/388 |
| 4,231,470 | 11/1980 | Parkes ........................... 99/443 C |

FOREIGN PATENT DOCUMENTS 18076 11/1927 Netherlands .
250128 4/1926 United Kingdom .

Primary Examiner—Roy N. Envall, Jr.
Assistant Examiner—Teresa J. Walberg
Attorney, Agent, or Firm—Ladas & Parry

[57] ABSTRACT

An oven which is suitable for use in baking bread and which incorporates a baking chamber through which an endless conveyor is driven for transporting product support trays into, through and from the chamber. The conveyor enters the lower region of the chamber, exits from an upper region of the chamber and makes a plurality of horizontal passes in ascending through the chamber. A bank of controller regulated heating elements is located between each of the horizontal passes of the conveyor but tunnels are provided in the lower region of the chamber to prevent heat from being radiated downwardly onto the product support trays during their initial stage of conveyance through the chamber.

12 Claims, 6 Drawing Figures

FOOD PROCESSING APPARATUS

FIELD OF THE INVENTION

This invention relates to a food processing apparatus and, in particular, to an apparatus which comprises a baking chamber and, optionally, a preceding chamber through which food items are conveyed and in which the food items are subjected to a controlled environment preparatory to passing into the baking chamber.

The apparatus has been developed primarily for use in the baking of bread and, for convenience of reference, the invention is hereinafter described in the context of such application. However, it will be understood that the apparatus may be employed in the baking of other food items such as cakes and pastries.

BACKGROUND OF THE INVENTION

The inventor has previously developed an oven which is suitable for use in baking cookies and which employs a chain conveyor for transporting product support trays from an upper to a lower level of the oven. The conveyor follows a generally serpentine path which includes a succession of horizontal passes in moving from the upper to the lower level and, during each of the horizontal passes, food items carried by the trays are exposed to overhead heating elements. Also, the trays are mounted to the conveyor in close-spaced relationship so that they tend to baffle heat migration between various notionally separate heating zones within the oven.

The above described (prior art) oven is disclosed in U.S. Pat. No. 4,004,129, granted to K. J. Hicks.

Whilst the previously developed oven has proved to be highly successful when used for baking cookies, it has not been found to be entirely suitable for baking bread. Thus, whereas cookies mixes should be exposed to relatively high initial heat from overhead heating elements when the products are first conveyed into the oven, bread dough and certain other product mixes should be subjected to deep heating. This means that the products should be exposed to heat from the underside of the product retainers during the initial baking stage and that top heat should be applied to the products only after baking has progressed beyond the initial stage.

Also, it should be mentioned that bread making involves a multi-stage process in which dough is kneaded and is set aside whilst fermentation occurs. Thereafter, the dough is punched-down, shaped, subjected to a further fermentation or "proving" period and baked. The successive proving and baking stages are subject to independent variables and it is believed that, for this reason, continuous line processing has not previously been feasible. Thus, in the baking of bread, one batch of dough may need to be subjected to a longer proving period than a second batch and, to compound the problem, it is possible that the first batch of dough may require a shorter baking period than the second batch. Therefore, it has not been possible to convey successive batches of dough serially through a proving chamber and an oven chamber because any required change in the speed of conveyance of the dough through the proving chamber would result in an unwanted corresponding change in speed of conveyance of the dough through the baking chamber. Conversely, any change made in the speed of conveyance of one batch of dough through the oven chamber would affect the speed of conveyance of a following batch of dough through the proving chamber, with potentially adverse consequencies.

Because of the need for independently variable conveyance speeds through the proving and baking chambers, such chambers conventionally are constructed as separate units and dough is loaded into the baking chamber after it has been passed through a proving chamber where it is subjected to a warm humid atmosphere. However, with the growth of point-of-sale baking businesses and the space/manpower restrictions to which such businesses are frequently subjected, a need has been created for a processing apparatus in which proving and baking may be performed serially and without a necessity for manhandling the dough from one chamber to another.

SUMMARY OF THE INVENTION

The present invention is directed to an oven which has broad applications and which incorporates a conveyor system for transporting products through the oven in a manner such that the products are exposed to heating stages which are appropriate to the baking requirements of such food items as bread, cakes and pastries. Also, the invention provides a food processing apparatus which incorporates such an oven and a preceding chamber through which the products are conveyed whilst being subjected to a controlled environment.

Thus, broadly defined, the present invention provides an oven which comprises a baking chamber having an inlet and an outlet, an endless conveyor extending through the chamber and directed to follow a generally serpentine path which includes a plurality of horizontal passes at different levels in the chamber, product support trays carried by the conveyor at spaced intervals along the length of the conveyor, a bank of horizontally disposed electric heating elements located between each of the horizontal passes of the conveyor, means for sensing the temperature level in various regions of the chamber, and means associated with the sensing means for controlling current flow to the heating elements whereby the temperature levels in the various regions may be maintained substantially constant at a selected level. The oven is characterised in that the chamber inlet communicates with a lower region of the chamber, the chamber outlet communicates with an upper region of the chamber, and a heat shield is located below at least one of the banks of heating elements in the lower region of the chamber to prevent heat from being radiated downwardly onto the product support trays during their initial stage of conveyance through the chamber.

In operation, the conveyor is driven to move in a direction toward the upper region of the chamber from the lower region. Successive ones of the product support trays are loaded onto the conveyor at a loading station and, after being transported through the chamber, are removed successively from the conveyor at an unloading station. Alternatively, the product support trays may be recycled through the oven chamber.

A considerable amount of trial and error experimentation has been directed toward development of the above defined oven. This has been necessary because the only ovens which previously have been manufactured for use in baking bread, cakes and pastries are the traditional batch processing ovens and linear feed tunnel type ovens. The present invention avoids the problems which are inherent in the traditional ovens, in that it provides for continuous feed, it avoids the hot spot problems which are encountered in batch processing ovens, it provides for rapid changes in baking conditions (so that different types of products may be baked one after another) and it avoids the floorspace requirements of the conventional tunnel type ovens.

The oven of the present invention does have a family resemblance with the cookie oven which is described in U.S. Pat. No. 4,004,129 (referred to previously) but, as mentioned earlier in this specification, the cookie oven has been found to be unsuitable for use in baking bread and certain other products for which the present oven has been developed.

PREFERRED FEATURES OF THE INVENTION

The inlet to the oven chamber preferably includes a horizontally extending tunnel which is located in the lowermost region of the chamber and through which the conveyor is directed. No heating elements are located within the tunnel, although the atmosphere within the tunnel will be influenced by heat which migrates toward the inlet from the main body of the chamber. A humidifier may be incorporated within the tunnel.

Also, the outlet from the oven chamber is preferably formed to include a downwardly extending tunnel which communicates at its upper end with the upper region of the chamber.

A sensor is preferably located adjacent each of the banks of heating elements for sensing the temperature level in the various zones of the chamber, and a controller is preferably associated with each bank of heating elements for controlling current flow to each bank.

A bank of horizontally disposed heating elements is preferably located above the uppermost horizontal pass of the conveyor, in addition to those which are located between the various conveyor passes.

The conveyor is preferably driven by a variable speed drive and the drive speed is selectively variable for controlling, in effect, the residence time of products conveyed through the oven chamber.

As previously mentioned, the oven may be formed as an extension of a preceding (first) chamber, in which food products may be subjected to a controlled environment, prior to entering the oven (second) chamber. In this arrangement, an endless conveyor extends through the two chambers for conveying successive food items serially through the two chambers, and means are provided for changing the effective path length of a forward moving leg portion of the conveyor which is at any one time located within the first chamber.

When used in baking of bread, the first chamber would comprise a proving chamber having heating elements and/or a heated-bath or splash-type humidifier.

When the conveyor is moved through the first and second chambers at a substantially constant velocity, any change which is made in the effective path length of the forward moving leg portion of the conveyor within the first chamber will result in a change in the residence time of the conveyor within the first chamber. Thus, with an increase made in the path length of the forward moving leg of the conveyor within the first chamber, any food item which is conveyed into the first chamber will remain resident in the first chamber for a greater period of time than it would if the path length were to be maintained constant. Conversely, with a reduction in the conveyor path length, the product residence time will be reduced.

Having regard to the fact that an endless conveyor is employed, any change made in the path length of the forward moving leg portion of the conveyor within the first chamber must be accompanied by a complementary change in the path length of another portion of the conveyor. Such complementary change may be made in a return leg portion of the conveyor or in a portion of the conveyor which precedes the first chamber.

The conveyor preferably comprises a pair of parallel spaced-apart endless conveyor elements which are arranged to support and carry a succession of horizontally disposed trays onto or into which the food items are loaded. Also, in order that the conveyor elements may be moved through a serpentine path, the trays preferably are pivotally supported by the conveyor elements, so that the trays may maintain a horizontal disposition regardless of the direction of movement at any one time of the conveyor elements.

The product support trays may be affixed to the conveyor elements and be recycled continuously through the apparatus. In such case, the products to be processed will be loaded into the trays ahead of the first chamber and be removed from the trays downstream of the second chamber. In the alternative, the support trays themselves may be removable from the conveyor elements and, in such case, a loading station will be provided ahead of the first chamber and an unloading station will be provided at the outlet end of the second chamber. Then, the products to be processed will be loaded into the trays at any convenient time and the trays together with the supported products will be picked-up, one after another, by the conveyor elements at the loading station. Thereafter, as the successive trays emerge from the second chamber, they may be tilted automatically, so that the products are tipped from the trays to fall onto a conveyor belt or the like, and, as a secondary operation, the trays may be released from the conveyor elements and be collected for subsequent use.

The invention will be more fully understood from the following description of a preferred embodiment of a baking oven which is suitable for use in the baking of bread and, as a preliminary step, proving of bread dough. The description is provided with reference to the accompanying drawings.

DETAILED DESCRIPTION OF THE INVENTION

Figure 1:
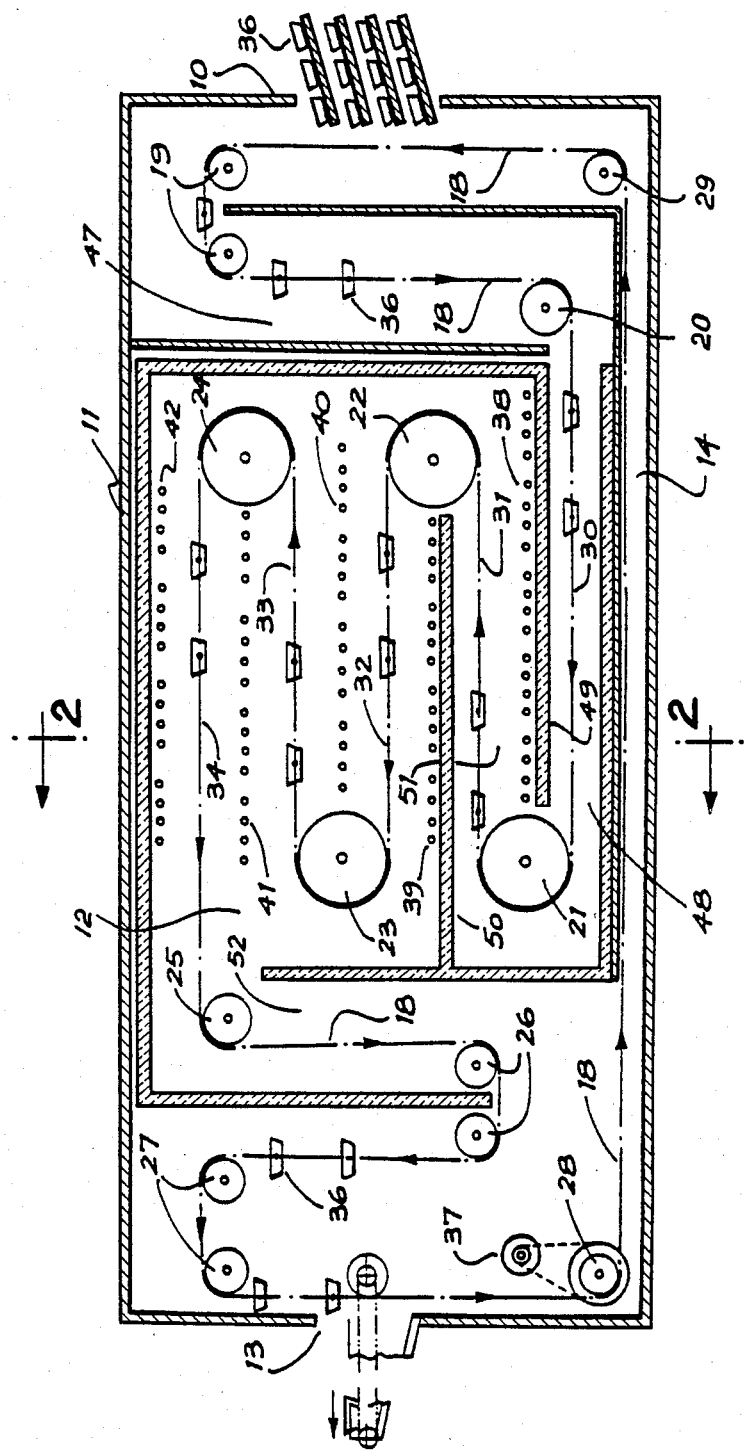
FIG. 1 shows a sectional side elevation view of the oven.
Figure 2:
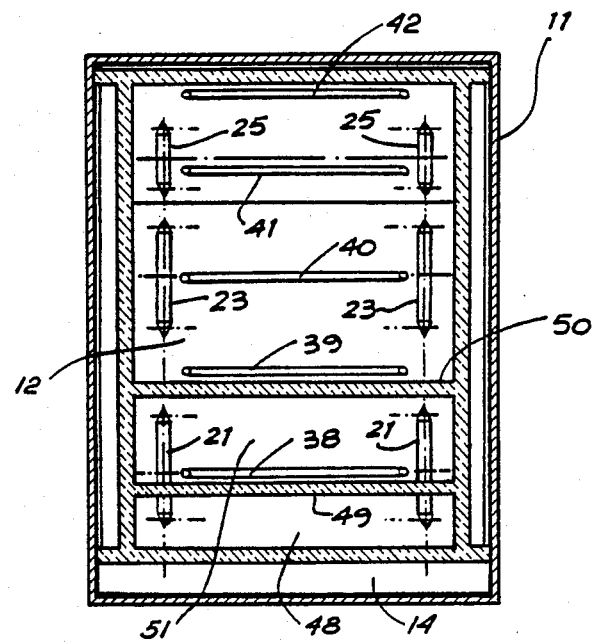
FIG. 2 shows a sectional end elevation view of the oven, as viewed in the direction of section plane 2—2 shown in FIG. 1.

As illustrated in FIGS. 1 to 4 of the drawings, the oven comprises a loading zone 10, an insulated cabinet 11 which defines a baking chamber 12, an unloading station 13 and a conveyor return passage 14.

A conveyor 18 which comprises a pair of parallel, spaced-apart endless conveyor chains 18a and 18b extends from the loading zone 10, through the chamber 12, through the unloading station 13 and back to the loading zone by way of the return passage 14. The conveyor chains 18 are supported and directed through the various regions by axle mounted sprockets 19 to 29 and, in passing through the chamber 12, the conveyor chains 18 follow a generally serpentine path which includes a series of five horizontal passes 30 to 34 at successively higher levels in the chamber.

Each of the conveyor chains 18 is provided with a series of inwardly directed pins 35 (FIG. 3) which carry product support trays 36. The trays 36 extend between the two conveyor chains 18a and 18b and are pivotably mounted to the pins 35 so that they maintain a horizontal disposition regardless of the direction of movement of the conveyor chains at any given time.

A relatively small number of trays 36 are shown in the drawings, but a significantly greater number would actually be conveyed through the oven and, when making horizontal passes through the chamber 12, adjacent trays would normally be disposed in close-spaced relationship.

Figure 3:
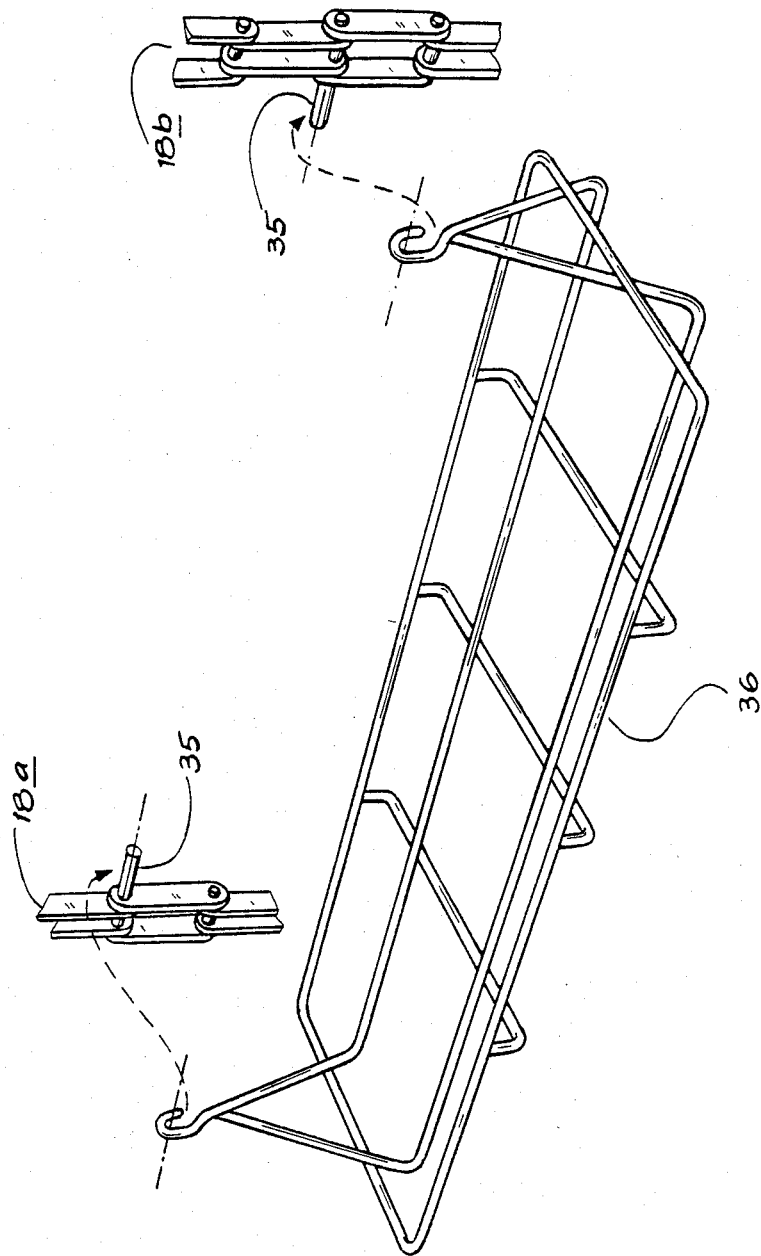
FIG. 3 shows a perspective view of a product support tray which is conveyed through the oven.

As shown in FIG. 3, each product support tray 36 is formed from wire and, although not shown in the drawings, each tray 36 is sized to carry a plurality of dough-containing trays. The product support trays 36 are loaded onto the (continuously moving) conveyor 18 at the loading zone 10 and are removed from the conveyor at the unloading station 13. Thus, the conveyor 18 does not carry any trays when moving through the return passage 14 from the unloading station 13 to the loading station 10. The conveyor chains 18 are driven to move in the direction indicated by the arrows in FIG. 1, and drive is imparted to the conveyor by a variable speed motor/gearbox arrangement 37, which is associated with the sprocket 28. A continuous drive is imparted to the conveyor chains 18, and the drive velocity is selectively variable so that the residence time of products conveyed through the oven chamber 12 may be varied to meet baking requirements.

Figure 4:
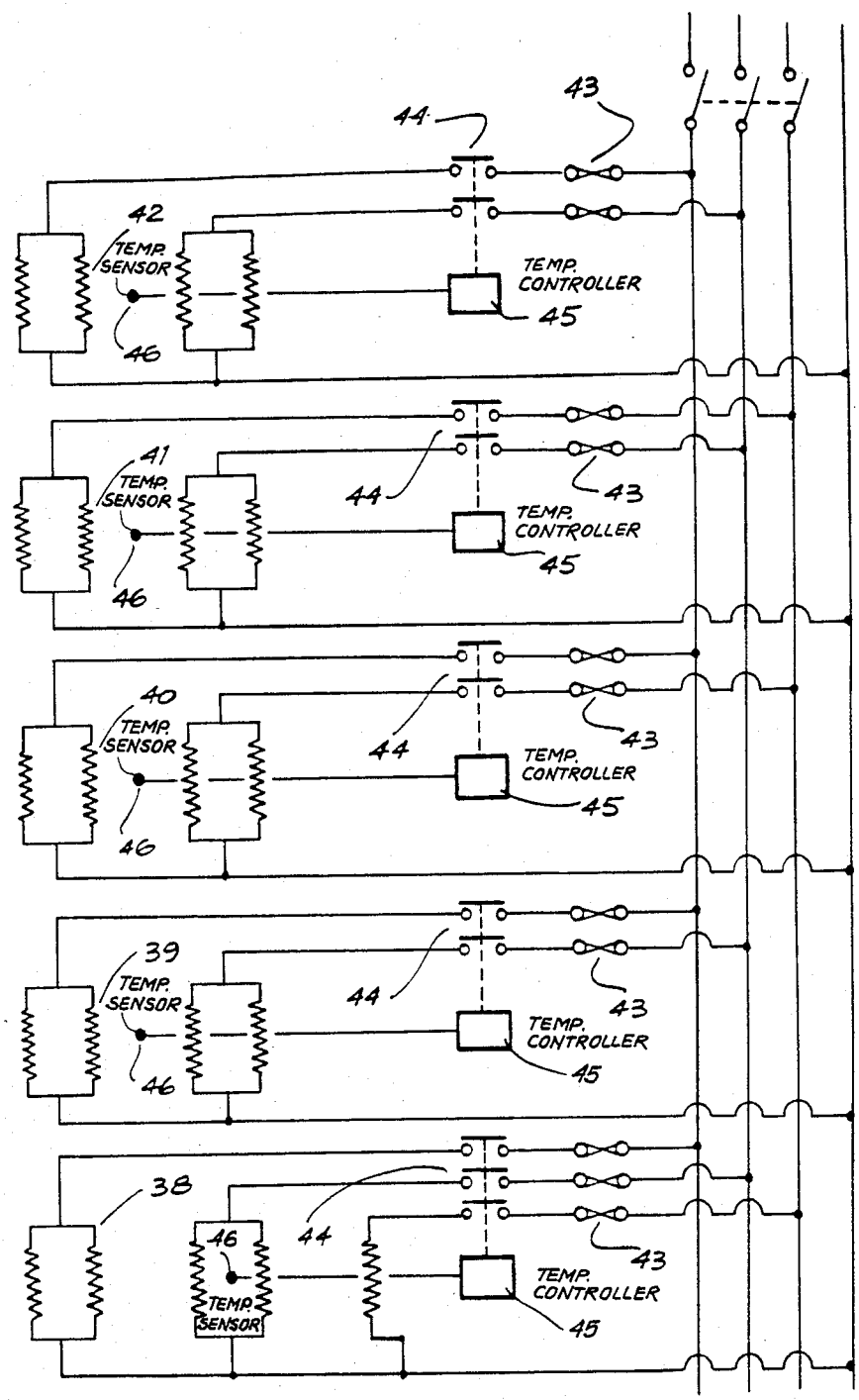
FIG. 4 shows a schematic circuit diagram of heating elements and associated control devices which are incorporated in the oven.

Five horizontally disposed banks of heating elements 38 to 42 are located at successively higher levels within the baking chamber 12, and the respective banks of heating elements are controlled as to their heat output to provide for required baking conditions. As shown in FIG. 4 of the drawings, the various banks of heating elements are connected to a three-phase current supply by way of fusable links 43 (or other overload protection devices) and by way of contactors 44. The contactors 44 are actuated by temperature controllers 45, and the controllers 45 function to open and close the contactors responsive to the temperature sensed in the region of each of the banks of heaters by sensors 46.

The controllers 45 can be set to provide a selected temperature in each of the sensed regions, so that the temperature within the various regions of the oven may be controlled in conjunction with the conveyor transport velocity to provide for optimum baking conditions.

The inlet to the oven communicates with a lower region of the baking chamber 12, and it includes a downwardly extending passageway 47 and a horizontally extending tunnel 48. No heating elements are located within the tunnel 48 but, rather, the lowermost bank of heating elements 38 is located immediately above the roof 49 of the tunnel. Thus, the roof 49 of the tunnel forms a heat shield. Also, a heat shield or baffle 50 is located immediately below the second lowest bank of heating elements 39 and forms, in effect, a second tunnel 51 which extends in a direction opposite that of the first tunnel 48.

Whilst being conveyed along the first tunnel 48, food products are subjected only to that heat which migrates downwardly through the chamber 12 and toward the inlet of the chamber. Then, whilst being conveyed through the second tunnel 51, the product support trays 36 are subjected to radiant heat which is directed against the underside of the trays from the elements 38. Thereafter, having passed through the first and second tunnels, the product support trays are subjected to radiant heat from above and below as they move along the successive horizontal passes 32 to 34.

The outlet from the chamber 12 includes a downwardly extending passageway or tunnel 52 which communicates at its upper end with the upper region of the chamber 12.

Figure 6:
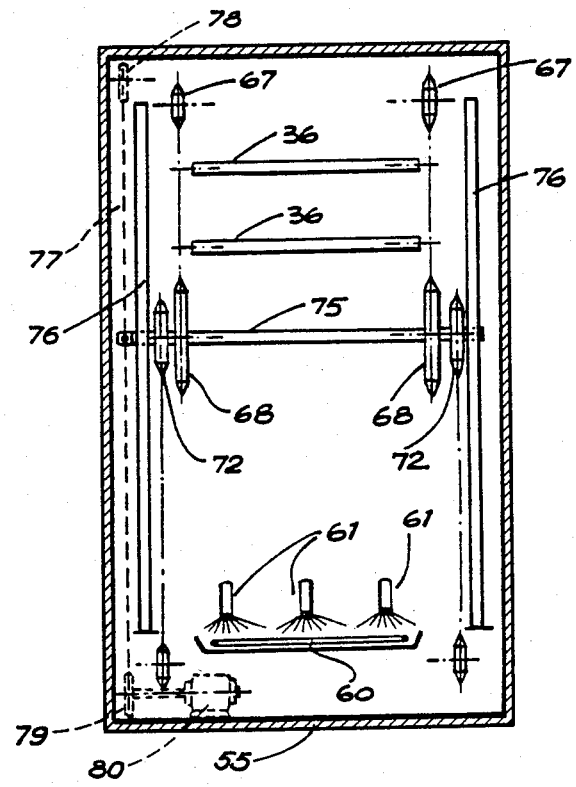
FIG. 6 shows a sectional end elevation view of the proving chamber as viewed in the direction of section plane 6—6 shown in FIG. 5.
Figure 5:
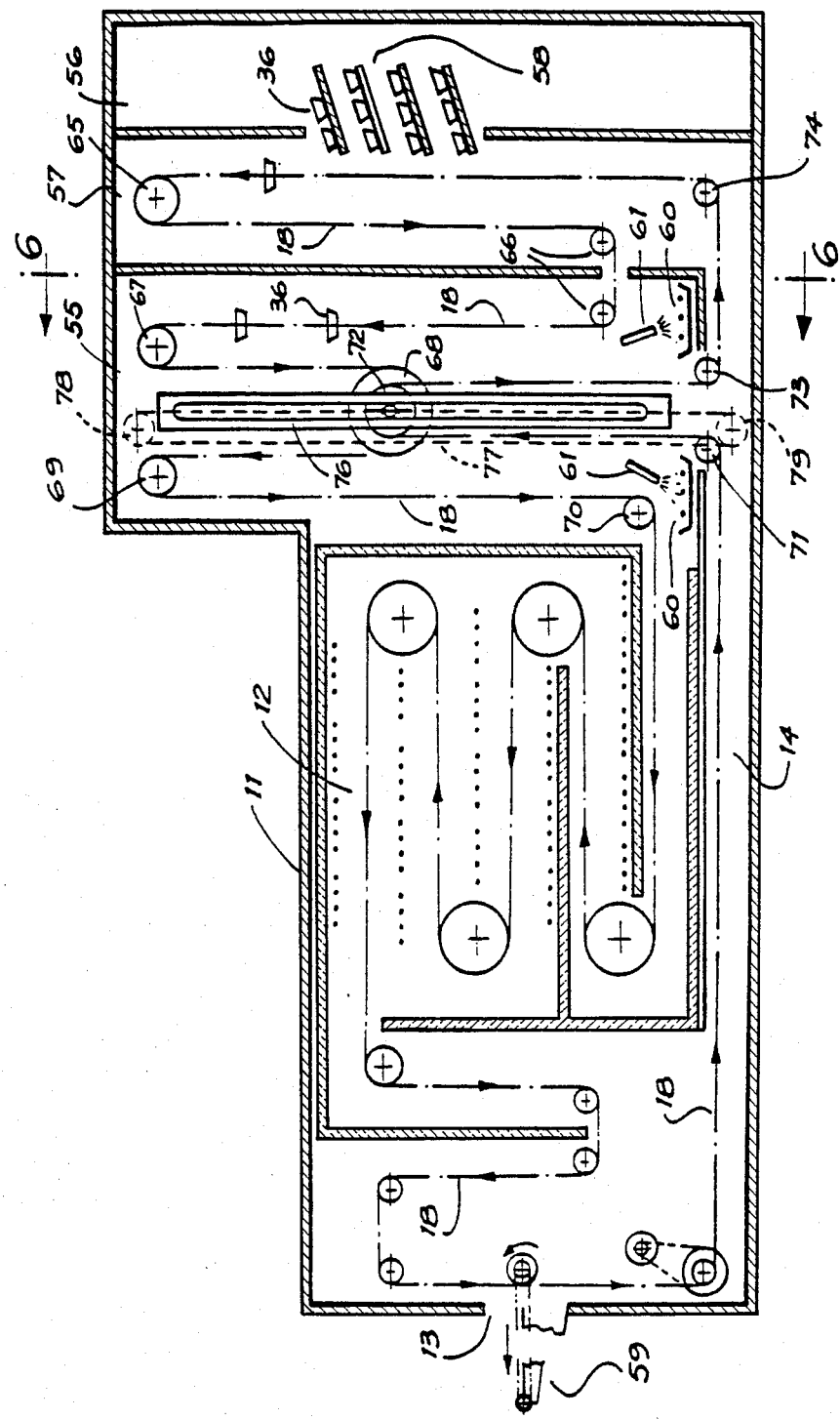
FIG. 5 shows a sectional side elevation view of the oven when embodied in a processing apparatus which incorporates a preceding proving chamber.

The apparatus as shown in FIGS. 5 and 6 of the drawings incorporates the above described oven and a preceding proving chamber 55. The apparatus is formed as a unitary structure and the conveyor 18 extends through both the oven and the proving chamber portions of the apparatus.

As illustrated, the apparatus comprises a cabinet 56 into which the product support trays 36 are loaded, a loading chamber 57, the proving chamber 55, the baking chamber 12, the unloading station 13 and the conveyor return passage 14. The trays 36 are supported at a loading station on inclined slides 58 which are located within the cabinet 56, and a mechanism (not shown) is provided in association with the slides 58 to permit transfer of the trays, one by one, from the slides to the conveyor 18. The trays 36 are then carried through the successive chambers and are transferred to a take-off conveyor 59 at the downstream side of the baking chamber 12.

The cabinet 56 and the loading chamber 57 may be refrigerated so as to maintain bread dough at a sufficiently low temperature to inhibit fermentation.

Electric heating elements 60 are located in the lower region of the proving chamber 55 and water outlets 61 are provided for splashing water onto or near the heating elements 60. Thus, the heating elements 60 and the water supply outlets 61 provide for the generation of a warm humid atmosphere within the proving chamber 55. The water flow rate and the operating temperature of the heating elements can be controlled to provide for optimum proving conditions.

The conveyor 18 is driven to move in the direction indicated by the arrows shown in FIG. 5, and it may be considered notionally as having a forward moving leg portion which extends from the loading station 57 to the take-off stations 13 and a return leg portion which travels back to the loading station 57 by way of the return passage 14. As above mentioned, the conveyor 18 comprises two parallel space-apart conveyor chains 18a and 18b, and the chains are supported and directed in their travel through the proving chamber 55 by sprocket pulleys 65 to 74.

The sprocket pulleys 68 and 72 within the proving chamber 55 comprise idler pulleys and they are mounted to a common shaft 75 (FIG. 6) which is supported by bearing blocks (not shown) within two spaced-apart vertically disposed slides 76. Thus, the shaft 75 and the sprocket pulleys mounted thereto can be moved upwardly and downwardly within the proving chamber 55, so that the effective length of the forward moving leg of the conveyor 18 within the proving chamber can be decreased or increased. With this arrangement, for any given transport velocity of the conveyor, the residence time of the trays 36 within the proving chamber 55 can be modified.

The forward moving leg of the conveyor 18 passes around the sprocket pulleys 68 and the return leg of the conveyor passes around the sprocket pulleys 72 so that, as the shaft 75 is moved downwardly in the slide 76, the effective length of the return leg of the conveyor within the proving chamber 55 decreases whilst the length of the forward moving leg of the conveyor increases. Conversely, when the effective length of the forward moving leg of the conveyor within the proving chamber is decreased, the effective length of the portion of the return leg of the conveyor within the proving chamber is increased by an equal amount.

A separate drive chain 77 is employed for positioning the shaft 75 relative to the vertical length of the slides 76 and, hence, for determining the effective path length of the forward moving leg of the conveyor within the proving chamber 55. The drive chain 77 passes around upper and lower sprocket pulleys 78 and 79 and it is connected to the shaft 75 by way of the bearing block (not shown) which supports the shaft. When the drive chain 77 is caused to move in a clockwise direction the shaft 75 is moved downwardly within the slide 76, and when the drive chain is moved in a counter-clockwise direction the shaft 75 is caused to move upwardly within the slides. The drive chain 77 may be moved manually, for example, by winding a crank which may be coupled to one of the sprocket pulleys 78 or 79, but, as shown in FIG. 6, the drive chain 77 is moved by an electric motor 80 which is energised when it is required that the effective path length of the conveyor within the proving chamber be modified.

When the motor 80 is energised to increase or decrease the effective length of the forward moving leg of the conveyor 18 within the proving chamber 15, with the arrangement as shown in the drawings, the whole portion of the conveyor length which is located to the right of the proving chamber 55 will be caused to advance in a forward direction or move in the reverse direction. The speed of such advancement or reverse movement may be greater than the normal transport speed of the conveyor 18 and, therefore, when the motor 80 is energised to decrease the effective path length of the forward moving leg of the conveyor, it may be necessary to remove some of the trays 36 which have been picked-up from the loading station 58 to prevent them from being "backed into" the loading station. Alternatively, the loading station may be constructed in a manner such that it is capable of receiving trays 36, which previously have been picked up by the conveyor 18, if the trays are moved backwards to the loading station.

I claim:

1. An oven comprising a baking chamber having an inlet which communicates with a lower region of the chamber, an outlet which communicates with an upper region of the chamber, an endless conveyor extending through the chamber and directed to follow a generally serpentine path which includes a plurality of horizontal passes at successively higher levels in the chamber, product support trays carried by the conveyor at spaced intervals along the length of the conveyor, a bank of horizontally disposed electric heating elements located at a level between each of the horizontal passes of the conveyor, means for sensing the temperature level in various regions of the chamber, means associated with the sensing means for controlling current flow to the heating elements whereby the temperature level in the various regions may be maintained substantially constant at selected levels, and a horizontally extending first tunnel located in the lowermost region of the chamber and connecting the inlet to the chamber by way of a horizontally extending second tunnel which is located immediately above the first tunnel and which extends in a direction opposite to that of the first tunnel, first and second heat shields which are constituted by roof portions of the first and second tunnels respectively, the heat shields being disposed to prevent heat from being radiated downwardly onto the product support trays during their conveyance through the tunnels, and a lowermost said bank of heating elements located in the second tunnel below the level of the horizontal pass made through the second tunnel by the conveyor.

2. The oven as claimed in claim 1 wherein the outlet of the chamber includes a downwardly extending tunnel which communicates at its upper end with the upper region of the chamber.

3. The oven as claimed in claim 1 wherein a bank of heating elements is located above the uppermost horizontal pass of the conveyor.

4. The oven as claimed in claim 1 wherein the conveyor is driven by a variable speed drive and the drive speed is selectively variable for controlling the residence time of products conveyed through the chamber.

5. The oven as claimed in claim 1 wherein the oven chamber communicates with a preceding chamber through which the conveyor extends before passing into the oven chamber, and wherein means are provided for changing the effective path length of a forward moving leg portion of the conveyor which is at any time located within the preceding chamber.

6. The oven as claimed in claim 5 wherein said preceding chamber is in the form of a proving chamber which incorporates means for humidifying products conveyed through the proving chamber en route to the oven chamber.

7. The oven as claimed in claim 6 wherein the conveyor comprises a pair of spaced-apart parallel chains between which the product support trays extend, wherein the forward moving leg portion of each conveyor chain within the proving chamber passes around a first pulley and a return leg portion of each conveyor chain within the proving chamber passes around a second pulley, wherein the first and second pulleys are mounted to a common horizontal shaft which extends in a direction between the conveyor chains, and wherein the shaft is driven to move upwardly and downwardly within the proving chamber to effect complementary changes in the effective lengths of the forward moving and return leg portions of the conveyor.

8. The oven as claimed in claim 7 wherein the shaft is journalled in vertical slides which are located within the proving chamber.

9. The oven as claimed in claim 8 wherein the shaft is positionable relative to the height of the slides by a drive chain which is connected to the shaft and coupled to a drive motor.

10. An oven comprising a baking chamber having an inlet which communicates with a lower region of the chamber, an outlet which communicates with an upper region of the chamber, an endless conveyor extending through the chamber and directed to follow a generally serpentine path which includes a plurality of horizontal passes at successively higher levels in the chamber, product support trays carried by the conveyor at spaced intervals along the length of the conveyor, a bank of horizontally disposed electric heating elements located at a level between each of the horizontal passes of the conveyor, means for sensing the temperature level in various regions of the chamber, means associated with the sensing means for controlling current flow to the heating elements whereby the temperature level in the various regions may be maintained substantially constant at selected levels, a horizontally extending tunnel located in the lowermost region of the chamber and connecting the inlet to the lower region of the chamber, and a heat shield located below the lowermost bank of heating elements, the heat shield being constituted by a roof portion of the tunnel and serving to prevent heat from being radiated downwardly onto the product support trays during their initial stage of conveyance into the chamber.

11. The oven as claimed in claim 10 wherein a second tunnel is located within the lower region of the chamber immediately above the first said tunnel, the second tunnel extending in a direction opposite to that of the first tunnel and having a roof which constitutes a second heat shield.

12. The oven as claimed in claim 11 wherein a single bank of heating elements is located in the second tunnel below the level of the horizontal pass made through the second tunnel by the conveyor.

* * * * *